(12) United States Patent
Sotokawa et al.

(10) Patent No.: US 6,952,276 B2
(45) Date of Patent: *Oct. 4, 2005

(54) PRINTER DETECTING DATA PRECISELY IN RESPONSE TO CHANGE IN DATA TRANSMISSION SPEED

(75) Inventors: Hiroshi Sotokawa, Nagano (JP); Takashi Kato, Nagano (JP)

(73) Assignee: Seiko Epson Corporation, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 449 days.

This patent is subject to a terminal disclaimer.

(21) Appl. No.: 09/127,688

(22) Filed: Jul. 31, 1998

(65) Prior Publication Data

US 2001/0043361 A1 Nov. 22, 2001

Related U.S. Application Data

(63) Continuation-in-part of application No. 09/014,161, filed on Jan. 27, 1998, now Pat. No. 6,570,666.

(30) Foreign Application Priority Data

| Jan. 27, 1997 | (JP) | ............................................. 9-12914 |
| Jan. 27, 1997 | (JP) | ............................................. 9-12915 |
| Jan. 27, 1997 | (JP) | ............................................. 9-12916 |
| Jul. 31, 1997 | (JP) | ............................................ 9-206851 |

(51) Int. Cl.[7] ............................. G06F 13/00; G06F 3/12
(52) U.S. Cl. .................................... 358/1.15; 358/1.13
(58) Field of Search ............................ 358/1.15, 1.14, 358/1.13, 1.16, 1.17

(56) References Cited

U.S. PATENT DOCUMENTS

| 4,930,087 | A | * | 5/1990 | Egawa et al. | ................ | 364/518 |
| 5,123,757 | A | * | 6/1992 | Nagaoka et al. | ............... | 400/61 |
| 5,542,071 | A | | 7/1996 | Maupin et al. | | |
| 5,822,522 | A | * | 10/1998 | Kazama | .................. | 395/200.13 |
| 5,881,240 | A | * | 3/1999 | Asano | .................... | 395/200.63 |
| 5,905,759 | A | * | 5/1999 | Ishida et al. | ................. | 375/282 |

FOREIGN PATENT DOCUMENTS

EP           596752         5/1994

* cited by examiner

*Primary Examiner*—Douglas Tran
(74) *Attorney, Agent, or Firm*—Sughrue Mion, PLLC

(57) ABSTRACT

A printer, which is connected to a host computer, comprises a synchronizing signal output section for outputting a synchronizing signal to the host computer, a data detection section for detecting print data received from the host computer by using a sampling signal, and a print processing execution section for performing print processing based on the detected print data, wherein the sampling signal has a frequency higher than the synchronizing signal has. Upon detection of a change command for changing the clock rate of the synchronizing signal from the host computer, the printer may give a signal to the host computer for instructing the host computer to stop transmitting data and change the synchronizing signal into the clock rate specified in the change command. Upon completion of changing the clock rate of the synchronizing signal, the printer may output a signal to the host computer for instructing the host computer to restart transmitting data. A count value is counted by a timer in sequence and each time the expiration of the counting is reached, a data output command signal may be output to a data transmission section and data of a predetermined length may be transmitted from the data transmission section to the host computer.

30 Claims, 15 Drawing Sheets

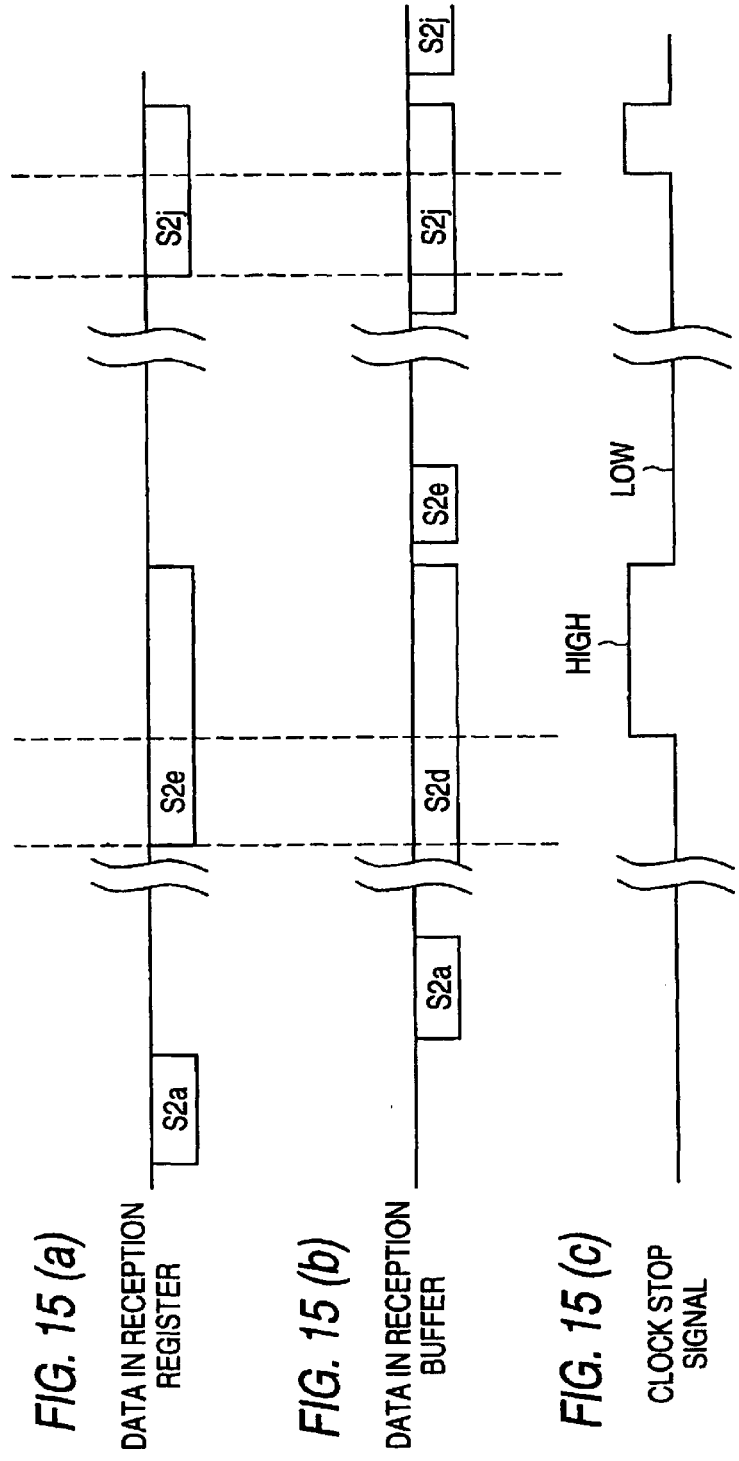
FIG. 15 (a) DATA IN RECEPTION REGISTER
FIG. 15 (b) DATA IN RECEPTION BUFFER
FIG. 15 (c) CLOCK STOP SIGNAL
FIG. 15 (d) SYNCHRONIZING SIGNAL CLOCK

PRINTER DETECTING DATA PRECISELY IN RESPONSE TO CHANGE IN DATA TRANSMISSION SPEED

This is a CIP application of U.S. Ser. No. 09/014,161 filed on Jan. 27, 1998 U.S. Pat. No. 6,570,666, the entirety of which is incorporated by reference.

BACKGROUND OF THE INVENTION

The present invention relates to a printer for executing print processing according to print data input from a host computer such as a personal computer and in particular to a printer to which print data is input from the host computer in synchronization with a synchronizing signal output from the printer to the host computer.

Some printers for executing print processing based on print data transmitted from a host computer adopt a two-way synchronous serial interface system wherein the printer supplies a synchronizing signal to the host computer and receives print data synchronized with the synchronizing signal from the host computer. The printer adopting such an interface system receives print data transmitted by a host computer at the same timing as a synchronizing signal supplied to the host computer, thereby performing print processing.

A first conventional printer adopting such an interface system samples print data transmitted by a host computer at the same timing as a synchronizing signal supplied to the host computer, thereby detecting print data. Specifically, the printer samples and detects a start bit placed at the top of data on the rising or falling edge of a synchronizing signal, thereby determining print data.

However, the first conventional printer cannot correctly detect print data if the channel between the printer and the host computer, for example, the length of a printer cable changes or the transmission speed becomes higher than the initial speed. Therefore, the first conventional printer may become unable to execute required print processing. That is, a delay on a channel such as the printer cable between the printer and the host computer or a transmission circuit of the host computer may cause the rising or falling timing of a synchronizing signal when the printer samples print data to differ from the rising or falling timing of a print data signal from the host computer. If the data transmission speed becomes high and the synchronizing signal frequency also becomes high, effect of the difference on the synchronizing signal width becomes larger relatively, thus the printer cannot detect a start bit in the print data.

A second conventional printer is a printer in a system wherein a host computer is connected to another computer and peripheral machines, for example, by a LAN (local area network). In the system, when the host computer outputs print data to the printer, it may change the data transmission speed to the printer because the host computer needs to perform any other processing at the same time.

In such a case, normally the host computer sends a change command for changing the clock rate of a synchronizing signal to the printer as data and the printer receiving the command changes the synchronizing signal to the corresponding clock rate.

However, generally the second conventional printer is adapted to once store the data transmitted from the host computer in a reception buffer memory and read the stored data in sequence for processing. Thus, if a data transmission speed change command as described above is transmitted, the change command is processed after the previously stored data is processed. Meanwhile, the host computer needs to stop transmitting data and stand by for a given time after transmitting the change command.

That is, a temporary wait occurs in the host computer because the host computer cannot send subsequent data until it becomes possible for the printer to receive data at new setup data transmission speed or until reception of a speed change complete notification from the printer. In this case, the host computer needs to be provided with a protocol for performing wait processing and the printer needs to be provided with a protocol for returning a speed change complete notification.

If the host computer is adapted to send data after the change command, the printer needs to be provided with a circuit capable of reliably receiving data after the data transmission speed is changed and the host computer needs also to be provided with a circuit capable of reliably transmitting data in such a case.

A third conventional printer is a printer for transmitting a status signal of a notifying a current state of the printer, such as printing, print completion, or no paper, to a host computer as required. In this case, the host computer notifies the host computer user of the current state of the printer. To communicate data between the printer and the host computer based on a synchronizing signal transmitted from the printer to the host computer as described above, a kind of the status signal is transmitted from the printer to the host computer in synchronization with the synchronizing signal.

Here, for example, if the host computer has a low data reception capability, namely, has a small input buffer or a low reception data processing capability, there is a fear of occurrence of incomplete or missing data in the host computer. In such a case, the third conventional printer adopts a technique of setting the transmission speed of data transferred between the host computer and the printer to low speed to such a degree that the host computer can process data.

The host computer transmits a data transmission speed change command to the printer, requesting the printer to lower the data transmission speed of the synchronizing signal output from the printer to such a degree that the host computer can process data, thereby temporarily changing the data transmission speed of the synchronizing signal output from the printer. In this case, the host computer receives a synchronizing signal at new setup data transmission speed from the printer, prepares for data reception at the speed, and upon completion of the preparation, transmits a completion signal (for example, Ready signal) to the printer, then receives data from the printer. After receiving the data from the printer, the host computer performs similar processing to change the data transmission speed to the former speed.

To perform data transmission speed change processing as described above, the host computer is provided with a protocol for performing such control and sends a predetermined command to the printer based on the protocol and a protocol corresponding thereto is also set in the printer.

However, in the third conventional printer, if the data transmission speed between the host computer and the printer is set low, as the data transmission speed from the host computer to the printer lowers, the time required for transmitting print data from the host computer is prolonged and it takes time until completion of print processing. To temporarily change the data transmission speed, the third conventional printer needs to perform complicated processing as described above; control becomes complicated and it takes extra time to execute processing.

A fourth conventional printer is a printer By the way, in a conventional printer transferring data from a data reception section in an interface control section to an input buffer in a print processing execution section by starting DMA (direct memory access) or using a general-purpose interrupt processing (data transfer by software) when data is received from the host. In the printer, often the input buffer in the print processing execution section is made of a so-called ring buffer. In such a case, for example, to execute DMA transfer of data from the data reception section to the input buffer (ring buffer), the counter value set in DMA becomes such as the empty area size to the termination address (the number of addresses) even if so-called link processing is performed. At the time of DMA termination, it becomes necessary to perform processing of returning the pointer to the top of the empty area in the ring buffer and resetting the counter. To transfer data from the data reception section to the input buffer (ring buffer) by the above-described general-purpose interrupt processing (data transfer by software), ring buffer processing is also required.

The data transfer rate (baud rate) in the serial communication system between a host and a printer keeps on speeding up year by year like 900 Kbps to 1.8 Mbps to 3.6 Mbps. If the processing for the data transfer termination (ring buffer processing) described above is late by the time the data reception section in the interface control section receives another data piece after one data piece is received at the data reception section and is transferred to the input buffer in the print processing execution section, an overrun error occurs and it is feared that the data in the data reception section may be lost. For example, if one byte of print data in a raster format is lost, print is simply placed out of order or the like, but if data containing control data is lost, a great deal of data may become missing.

In the two-way serial communication system between a host and a printer, the printer can inform the host of a BUSY state so that the host stops data transfer. However, if the host is informed of the BUSY state, generally it cannot immediately stop the data transfer. Thus, it is impossible to completely prevent an overrun error from occurring simply by informing the host of the BUSY state.

For example, assuming that data is transferred at a baud rate of 1.8 Mbps, 1-byte data is sent once about 5 $\mu$s from the host. In the case of the data processing speed of the printer is slow, even if DMA transfer of data is executed from the data reception section to the input buffer (ring buffer), it is feared that the processing at the DMA transfer termination time described above may be late by the time the data reception section in the interface control section receives another data piece after one data piece is received at the data reception section and is DMA-transferred to the input buffer in the print processing execution section.

SUMMARY OF THE INVENTION

It is therefore an object of the present invention to provide a printer that can correctly detect print data from a host computer even if data transmission speed becomes high or a channel becomes long.

It is another object of the present invention to provide a printer that can change data transmission speed easily.

It is still another object of the present invention to provide a printer that can reliably transmit necessary data to the host computer even if the host computer has a low data processing capability.

It is still another object of the present invention to provide a printer capable of effectively preventing an overrun error from occurring even if it takes time in processing for the termination of the data transfer from a data reception section in an interface control section to an input buffer in a print processing execution section.

Other objects of the present invention will appear more fully from the following description.

According to one aspect of the present invention, there is provided a printer for transmitting a synchronizing signal to a host computer, using a sampling signal to detect print data from data transmitted from the host computer in synchronization with the synchronizing signal, and performing print processing based on the detected print data, characterized in that the sampling signal has a frequency higher than the synchronizing signal has.

According to another aspect of the present invention, there is provided a printer comprising an interface control section for communicating data between a host computer, a print processing execution section for performing print processing based on data received from the host computer through the interface control section, a synchronizing signal output section being placed in the interface control section for outputting a synchronizing signal to the host computer, a data reception section being placed in the interface control section for receiving data transmitted from the host computer at data transmission speed based on the synchronizing signal, a command detection section for detecting a change command for changing the clock rate of the synchronizing signal in the data received at the data reception section, and a control section being placed in the interface control section, when the command detection section detects the change command, the control section for giving a signal to the host computer for instructing the host computer to stop transmitting data and controlling the synchronizing signal output section so as to change the synchronizing signal to the clock rate specified in the change command, upon completion of changing the clock rate of the synchronizing signal, the control section for outputting a signal to the host computer for instructing the host computer to restart transmitting data.

According to still another aspect of the present invention, there is provided a printer comprising: an interface control section for communicating data between a host computer; a print processing execution section for performing print processing based on data received from the host computer via the interface control section; a timer section for counting a setup count value in sequence, a control section for outputting a data output command signal each time the expiration of the counting in the count section is reached; and a data transmission section for transmitting data of a predetermined length to the host computer upon reception of the data output command signal from the control section.

According to still another aspect of the present invention comprises an interface control section for transmitting and receiving data to and from a host and a print processing execution section for performing predetermined print processing based on data received from the host, characterized in that the interface control section comprises a synchronizing signal output section for outputting a synchronizing signal to the host, a data reception section for receiving data transmitted from the host in synchronization with the synchronizing signal, and a control section for performing control for the host, that the print processing execution section comprises an input buffer memory section for temporarily storing data transferred from the data reception section, and that if another data piece is received at the data reception section in a state in which one data piece is not yet transferred from the data reception section to the input buffer memory section, the control section instructs the synchronizing signal output section to stop synchronizing signal output to the host. And when one data piece is transferred from the data reception section to the input buffer memory section and the data reception section becomes ready to receive another data piece, the control section instructs the synchronizing signal output section to restart synchronizing signal output to the host.

DETAILED DESCRIPTION OF THE PREFERRED EMBODIMENTS

Referring now to the accompanying drawings, there are shown preferred embodiments of the present invention.

1. First Embodiment

Figure 1:
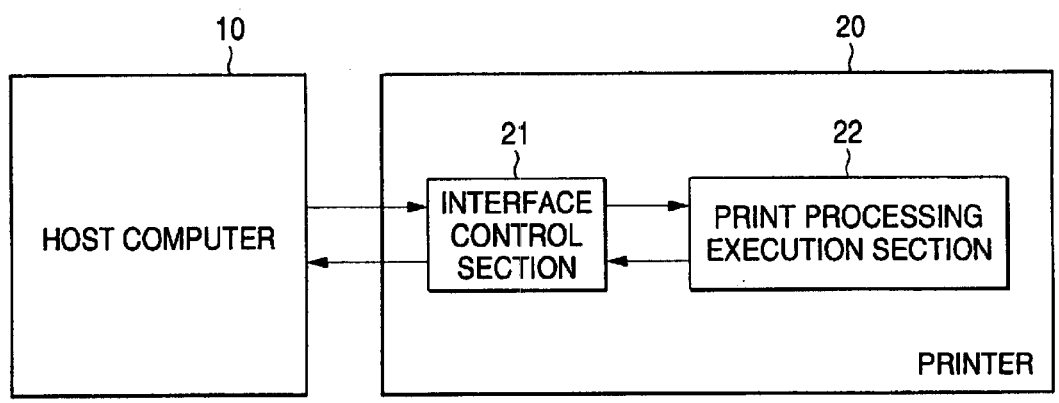
FIG. 1 is a block diagram to show a printer according to a first embodiment of the present invention.

FIG. 1 is a block diagram to show a printer according to a first embodiment of the present invention. As shown in FIG. 1, the printer 20 is connected to a host computer 10 such as a personal computer by a printer cable (not shown), etc. The printer 20 is made up of an interface control section (I/F) 21 for communicating data between the host computer 10 and a print processing execution section 22 connected to the interface control section 21.

Figure 2:
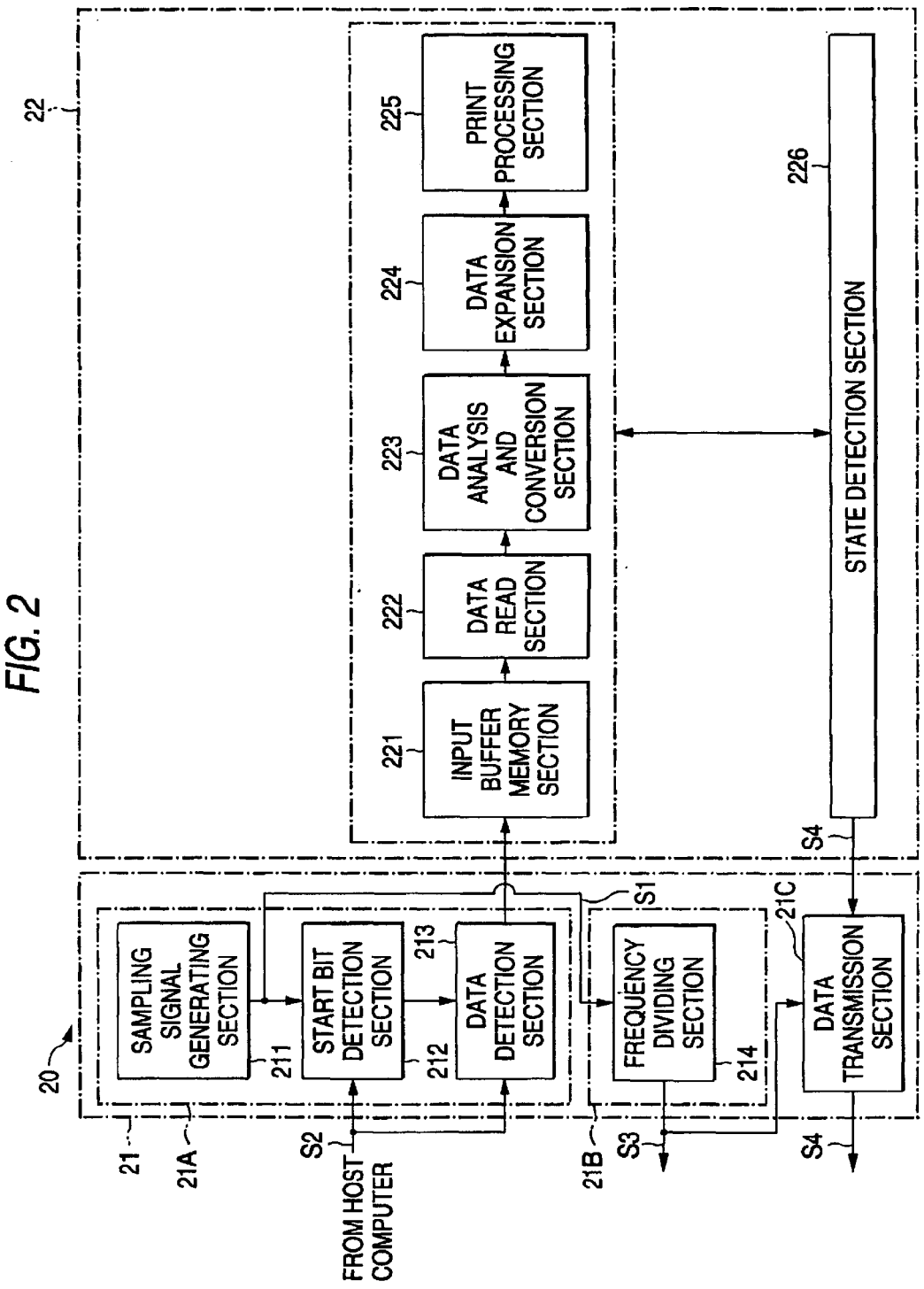
FIG. 2 is a block diagram to show the internal configuration of the printer in FIG. 1.

As shown in FIG. 2, the interface control section 21 comprises a data reception section 21A for receiving data S2 from the host computer 10, a synchronizing signal output section 21B for outputting a synchronizing signal S3, and a data transmission section 21C for outputting a status signal S4. The data S2 from the host computer 10 contains print data, a control command, etc. The data reception section 21A is made up of a sampling signal generation section 211, a start bit detection section 212, and a data detection section 213. The synchronizing signal output section 21B consists essentially of a frequency dividing section 214. The start bit detection section 212 and the data detection section 213 make up a print data detection section (not shown).

The sampling signal generation section 211 generates a sampling signal S1 for sampling print data from data transmitted from the host computer 10 at a predetermined frequency. The start bit detection section 212 samples print data from the data S2 transmitted from the host computer 10 at the timing at which the sampling signal S1 rises or falls, and detects a start bit placed at the top of the print data. The data detection section 213 detects a data part of the data S2 following the start bit and transmits the detected data part to the print processing execution section 22. The frequency dividing section 214 divides the sampling signal S1 from the sampling signal generation section 211 and transmits the divided signal to the host computer 10 as the synchronizing signal S3.

The print processing execution section 22 is made up of a input buffer memory section 221, a data read section 222, a data analysis and conversion section 223, a data expansion section 224, a print processing section 225, a state detection section 226, etc.

The input buffer memory section 221 temporarily stores data input via the data detection section 213 of the interface control section 21. The data read section 222 reads the data stored in the input buffer memory section 221 in sequence. The data analysis and conversion section 223 analyzes the data read by the data read section 222 and converts the data into a predetermined data format.

The data expansion section 224 expands the data provided by the data analysis and conversion section 223 into print image data.

The print processing section 225 performs print processing based on the print image data provided by the data expansion section 224. The state detection section 226 outputs the status signal S4 indicating the current state of the printer 20, such as printing, print completion, or no paper. The status signal S4 is output from the data transmission section 21C of the interface control section 21 to the host computer 10 in synchronization with the synchronizing signal S3 at a predetermined timing. In addition to the status signal S4, for example, a code signal for indicating the model of the printer 20 is transmitted from the printer 20 to the host computer 10.

The operation of the sections of the printer 20 is normally controlled by a central processing unit (CPU) installed in the printer 20 for performing required processing in accordance with instructions (a computer program and necessary data) stored in an instruction storage unit such as a ROM installed in the printer 20.

Next, an example of the operation of the printer 20 will be discussed with reference to FIG. 3, which shows the timings of the sampling signal S1 generated in the printer 20, the synchronizing signal S3 transmitted from the printer 20 to the host computer 10, the data S2 input to the printer 20, and the like.

The data S2 begins with a start bit part B1, followed by a data part B2, followed by a parity bit part B3 for the data part B2, followed by a stop bit part B4. This format of the data S2 is basically the same as that adopted by a UART (universal asynchronous receiver transmitter) of a known controller. For example, the start bit part B1 and the parity bit part B3 each consists of one bit, the data part B2 consists of eight bits, and the stop bit part B4 consists of two bits.

With the printer 20 and the host computer 10 connected by a printer cable, the synchronizing signal S3 is output from the interface control section 21 of the printer 20 to the host computer 10. As the host computer 10 receives the synchronizing signal S3, it generates data S2 synchronized with the synchronizing signal S3 and transmits the data S2 to the printer 20 via the printer cable, etc.

The data S2 is synchronized with the synchronizing signal S3 output from the printer 20. Therefore, the start bit B1 of the data S2 arrives at the printer 20 at the timing delayed as much as the going and returning channels between the printer 20 and the host computer 10 and the channel in the transmission circuit of the host computer 10. The start bit detection section 212 detects the start bit B1 of the received data S2 at the timing at which the sampling signal S1 rises, for example, and sends the detection result to the data detection section 213. Upon reception of the detection result from the start bit detection section 212, the data detection section 213 outputs the data part B2 of the data S2 following the start bit B1 to the input buffer memory section 221 of the print processing execution section 22. The print processing execution section 22 executes necessary print processing based on the data part B2.

Figure 3:
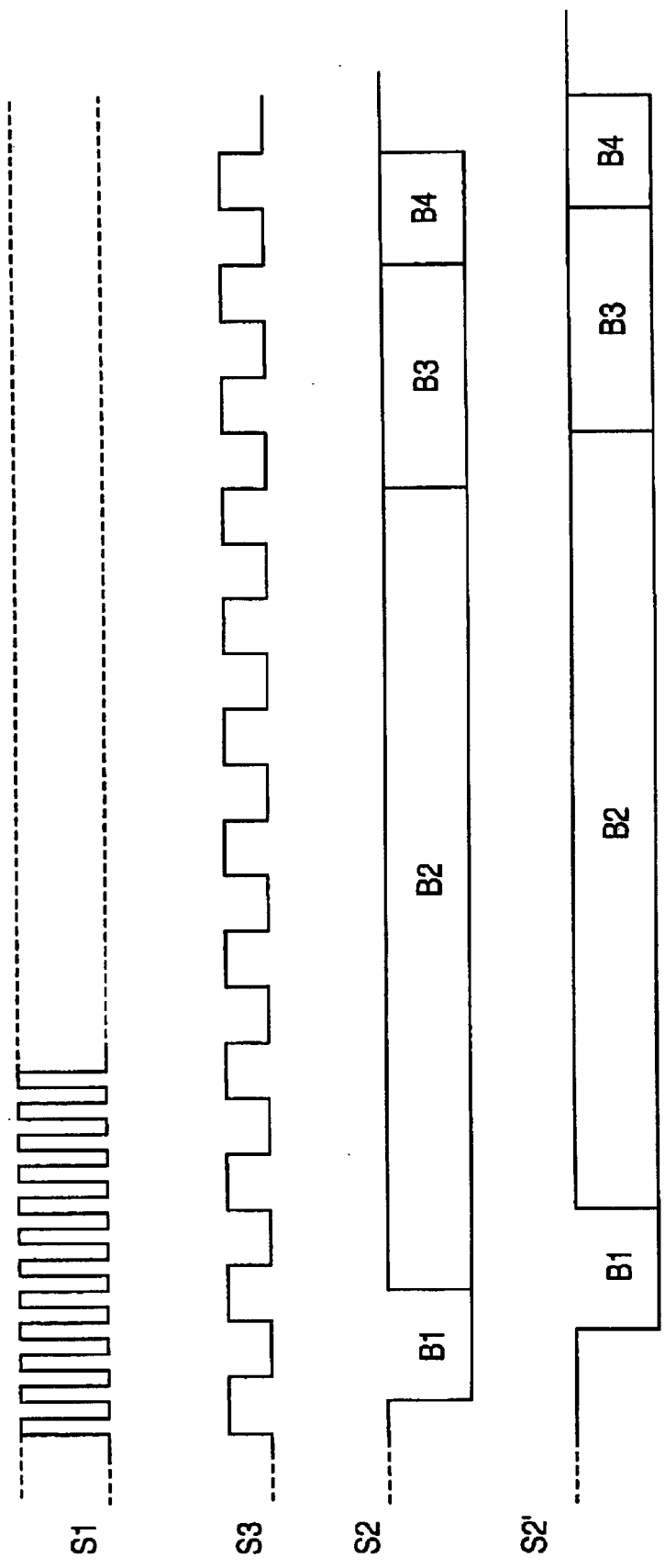
FIG. 3 is a timing chart to explain the operation of the printer in FIG. 1.

In FIG. 3, data S2' means an example wherein a long printer cable is placed between the printer 20 and the host computer 10. In this case, the start bit B1, etc., of the data S2' is furthermore delayed as compared with the data S2.

In the first embodiment, the sampling signal is divided to generate the synchronizing signal. However, the present invention is not limited to it. That is, the printer of the present invention may have a device for generating a synchronizing signal apart from a sampling signal. In the printer of the present invention, the frequency of the sampling signal must have be set higher than that of the synchronizing signal. If the frequency of the sampling signal is set to about 4 to 16 times as high as the frequency of the synchronizing signal, a sufficient effect is produced on practical use, but the present invention is not necessarily limited to it. Further, the frequency of the sampling signal may be set apart from the frequency of the synchronizing signal. In this case, the flexibility of the frequency of the synchronizing signal is increased and the synchronizing signal can be changed as desired in response to the specifications of the printer.

As seen from the description made so far, the printer according to the first embodiment of the present invention detects the print data from the host computer by the sampling signal having a higher frequency than the frequency of the synchronizing signal. Therefore, even if the data transmission speed becomes high or the channel becomes long, the printer according to the first embodiment of the present invention can detect the print data reliably. In other words, the printer allows the channel to be made long and the data transmission speed to be made high so long as the waveform becomes dull, thus the printer can be used in a wide range of application.

2. Second Embodiment

Figure 4:
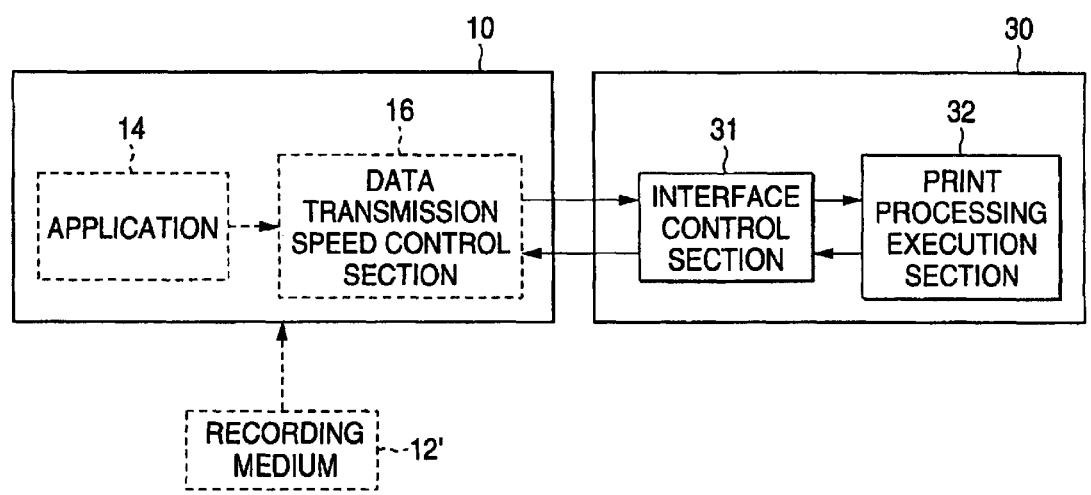
FIG. 4 is a block diagram to show a printer according to a second embodiment of the present invention.

Next, a second embodiment of the present invention will be discussed with reference to FIGS. 4 to 6. Parts identical with those previously described with reference to the first embodiment are denoted by the same reference numerals. As shown in FIG. 4, a printer 30 according to the second embodiment of the present invention is connected to a host computer 10 by a printer cable (not shown), whereby the printer 30 and the host computer 10 make up a print system. The printer 30 is made up of an interface control section 31 connected to the host computer 10 and a print processing execution section 32 connected to the interface control section 31.

Figure 5:
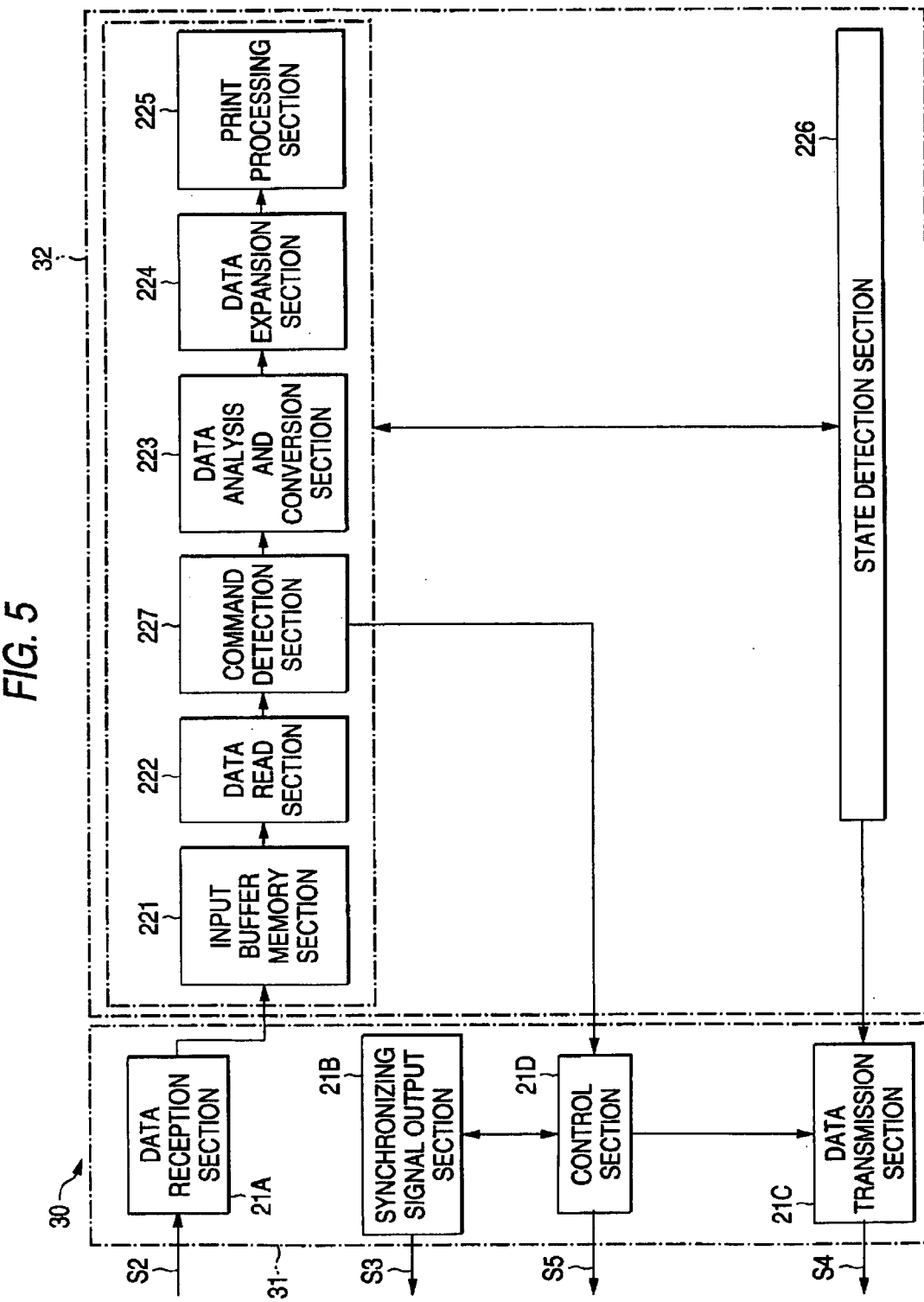
FIG. 5 is a block diagram to show the internal configuration of the printer in FIG. 4.
Figure 6:
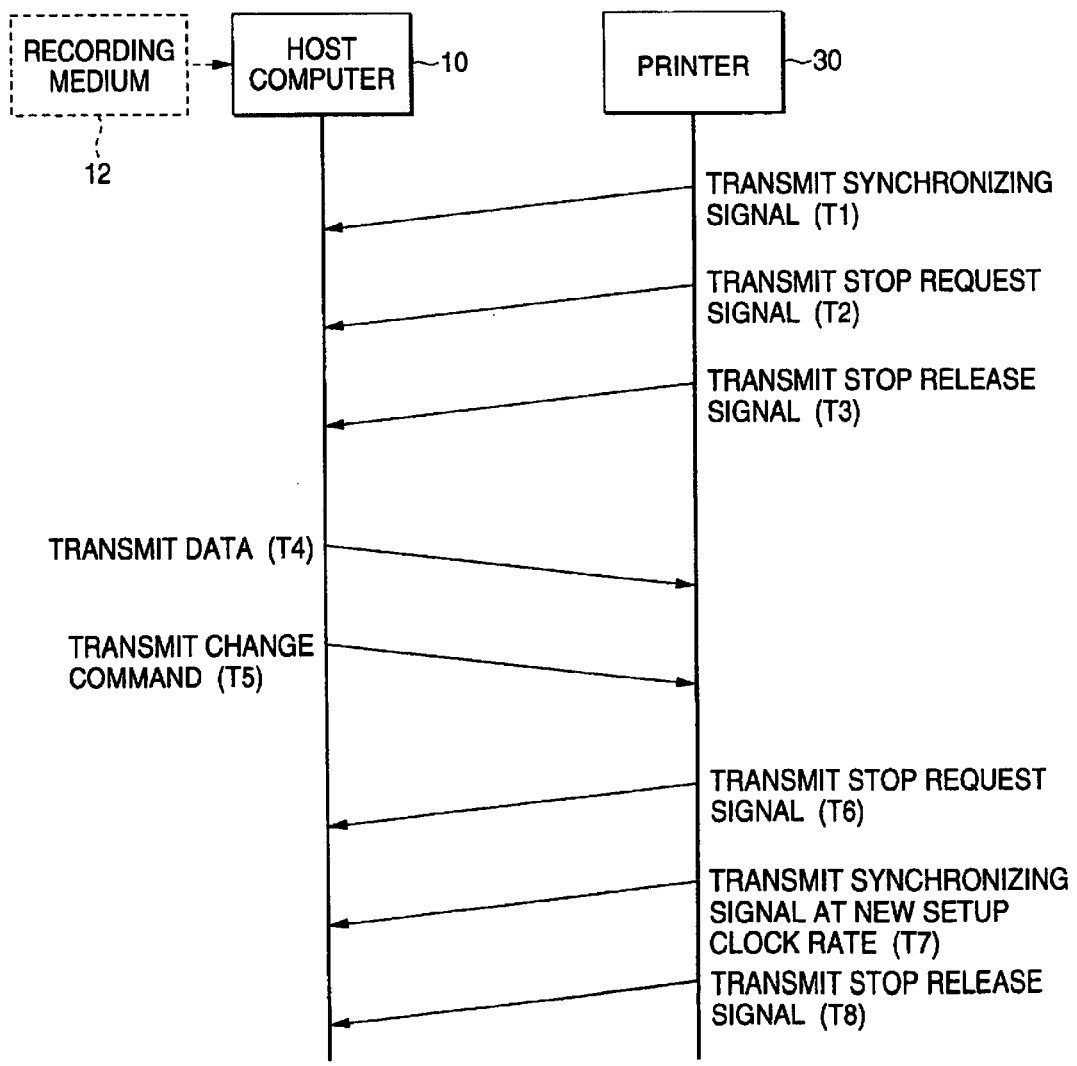
FIG. 6 is a sequence chart to explain the operation of the printer in FIG. 4.

As shown in FIG. 5, the interface control section 31 comprises a data reception section 21A, a synchronizing signal output section 21B, a data transmission section 21C, and a control section 21D. The data reception section 21A receives data S2 transmitted from the host computer 10 and transmits the data containing print data, control commands, etc., to the print processing execution section 32. The synchronizing signal output section 21B outputs a synchronizing signal S3 to the host computer 10. If the control section 21D receives a change command for changing the clock rate of the synchronizing signal from the print processing execution section 32, it gives a clock rate change signal to the synchronizing signal output section 21B, requesting the synchronizing signal output section 21B to change the clock rate of the synchronizing signal to the clock rate as specified in the change command. When receiving the clock rate change signal from the control section 21D, the synchronizing signal output section 21B changes the synchronizing signal S3 to the clock rate corresponding to the clock rate change signal.

The print processing execution section 32 has a reception buffer memory section 221, a data read section 222, a command detection section 227, a data analysis and conversion section 223, a data expansion section 224, a print processing section 225, and a state detection section 226.

The input buffer memory section 221 temporarily stores data input via the data reception section 21A of the interface control section 31. The data read section 222 reads the data stored in the input buffer memory section 221 in sequence. When the command detection section 227 detects the change command in the data read by the data read section 222, it sends the change command to the control section 21D. The data analysis and conversion section 223 analyzes print data in the data read by the data read section 222 and converts the print data into a predetermined data format. The data expansion section 224 expands the data provided by the data analysis and conversion section 223 into print image data. The print processing section 225 performs print processing based on the print image data provided by the data expansion section 224.

As in the first embodiment, the operation of the sections of the printer 30 is controlled by a central processing unit (CPU) for performing required processing in accordance with instructions (a computer program and necessary data) stored in an instruction storage unit such as a ROM installed in the printer 30.

Next, the operation of the printer 30 according to the second embodiment of the present invention will be discussed with reference to FIG. 6, which is a sequence chart to show a data transfer sequence between the host computer 10 and the printer 30. In the description to follow, T1–T8 denote processing steps.

The host computer 10 and the printer 30 are connected by a printer cable, etc., for making up a print system. In this state, first a synchronizing signal S3 is output at a default clock rate from the synchronizing-signal output section 21B of the interface control section 31 in the printer 30 to the host computer 10 at step T1. Next, the printer 30 outputs a stop request signal, for example, BUSY signal, as a signal S5 to the host computer 10 or outputs stop request data, for example, XOFF code as a status signal S4 from the data transmission section 21C to the host computer 10 for requesting the host computer 10 to stop transmitting data to the printer 30 at step T2. After completion of necessary initialization processing and warm-up processing, the printer 30 outputs a stop release signal, for example, READY signal, as a signal S5 to the host computer 10 or outputs stop release data, for example, XON code as a status signal S4 from the data transmission section 21C to the host computer 10 at step T3. Next, the host computer 10 starts to transmit data S2 to the printer 30 at step T4.

After this, the host computer 10 transmits data S2 to the printer 30 as required and the printer 30 receives the data S2 at the data reception section 21A of the interface control section 31. The data reception section 21A transmits the data S2 to the print processing execution section 32, which then performs command detection and necessary print processing based on the received data. To output a change command for changing the clock rate of the synchronizing signal S3 from the host computer 10 to the printer 30, the change command is transmitted with data S2 to the printer 30 at step T5.

The change command is passed through the data reception section 21A of the interface control section 31 and is detected by the command detection section 227 of the print processing execution section 32. The command detection section 227 notifies the control section 21D of detection of the change command. Upon reception of the notification, the control section 21D outputs a stop request signal for requesting the host computer to stop transmitting data as a signal S5 to the host computer 10 or outputs stop request data as a status signal S4 from the data transmission section 21C to the host computer 10 at step T6. Further, the control section 21D instructs the synchronizing signal output section 21B to change the synchronizing signal S3 into the clock rate specified by the change command.

When the synchronizing signal output section 21B completes changing the clock rate of the synchronizing signal S3, it transmits the synchronizing signal S3 at the new setup clock rate to the host computer 10 at step T7. The synchronizing signal output section 21B notifies the control section 21D that the clock rate change is complete. In this case, the control section 21D transmits a stop release signal as a signal S5 to the host computer 10 or outputs stop release data as a status signal S4 from the data transmission section 21C to the host computer 10 at step T8.

After this, the host computer 10 transmits data S2 based on the synchronizing signal S3 at the new setup clock rate and the data transmission section 21C of the printer 30 transmits a status signal S4 based on the synchronizing signal S3 at the new setup clock rate.

In the second embodiment, the operation of the sections of the printer 30 is controlled by the CPU for performing required processing in accordance with the computer program, etc., stored in the ROM, etc., installed in the printer 30. However, as indicated by the dashed line in FIG. 6, a program for controlling the printer 30 may be stored on a recording medium 12 and the host computer 10 may read and execute the program stored on the recording medium 12.

As indicated by the dash line in FIG. 4, for instance, the host computer 10 may have a data transmission speed control section 16 for controlling so that print data prepared at a predetermined data preparation speed by application software 14 can be transmitted in synchronization with the clock rate of the synchronizing signal S3.

Processing similar to that performed by the data transmission speed control section 16 may be stored on a recording medium 12' as a program and the host computer 10 may read and execute the program.

3. Third Embodiment

Next, a third embodiment of the present invention will be discussed with reference to FIG. 7. Parts identical with those previously described with reference to the accompanying drawings are denoted by the same reference numerals. A printer 30 according to the third embodiment of the present invention is made up of an interface control section 33 connected to a host computer 10 and a print processing execution section 34 connected to the interface control section 33.

Figure 7:
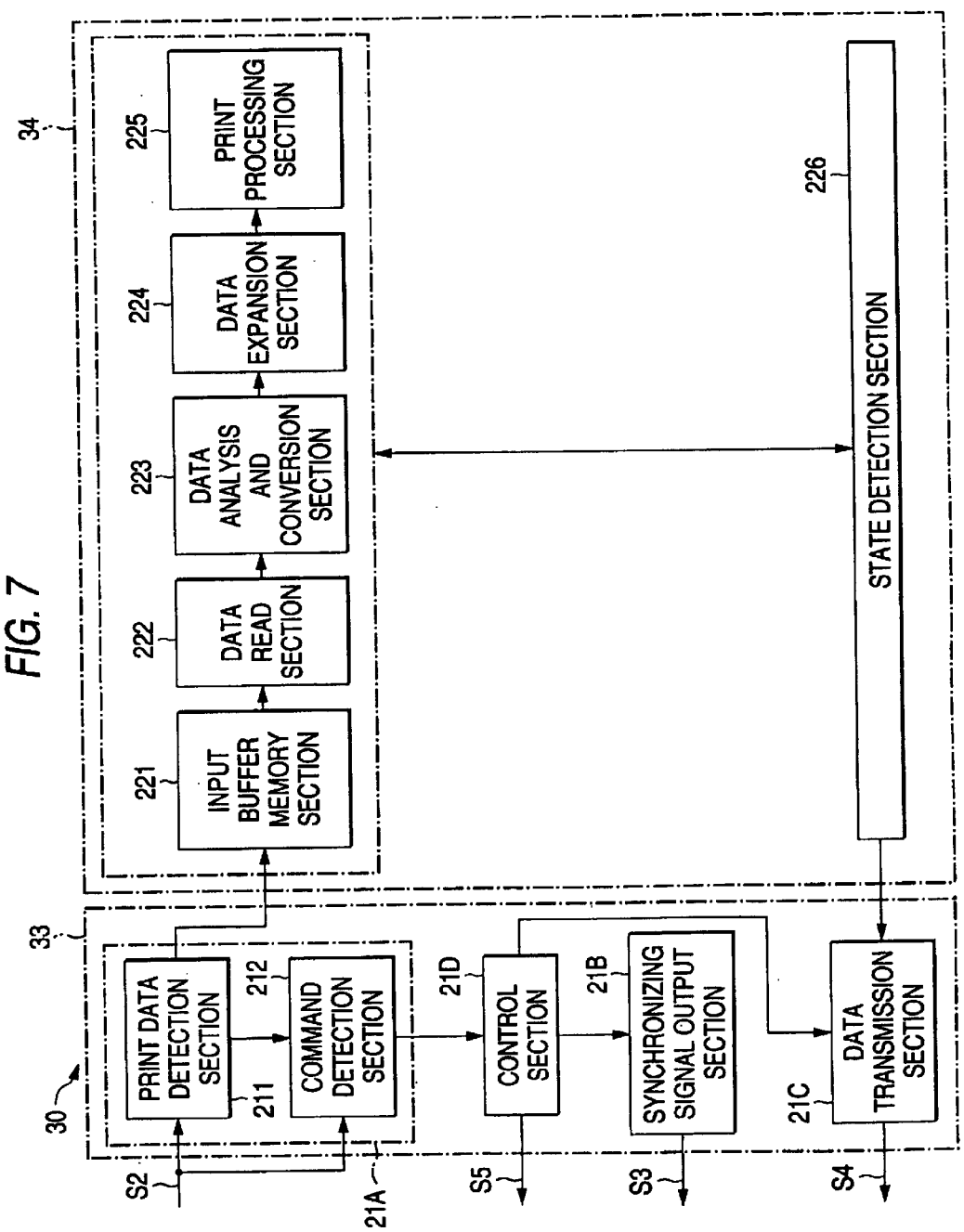
FIG. 7 is a block diagram to show the internal configuration of a printer according to a third embodiment of the present invention.

As shown in FIG. 7, the interface control section 33 comprises a data reception section 21A, a synchronizing signal output section 21B, a data transmission section 21C, and a control section 21D. The data reception section 21A is made up of a print data detection section 211 and a command detection section 212. The print processing execution section 34 has a input buffer memory section 221, a data read section 222, a data analysis and conversion section 223, a data expansion section 224, a print processing section 225, and a state detection section 226.

In the interface control section 33, the print data detection section 211 detects print data in data S2 transmitted from the host computer 10 and transmits the detected print data to the print processing execution section 34. When detecting a clock rate change command in the data S2, the command detection section 212 notifies the control section 21D of detection of the change command. Upon reception of the notification indicating of detection of the change command from the command detection section 212, the control section 21D instructs the synchronizing signal output section 21B to change the clock rate of a synchronizing signal into the clock rate corresponding to the change command. The print processing execution section 34 is the same as that shown in FIG. 2 and therefore will not be discussed again.

As in the first and second embodiments, the operation of the sections of the printer 30 is controlled by a central processing unit (CPU) for performing required processing in accordance with instructions (a computer program and necessary data) stored in instruction storage means such as a ROM installed in the printer 30.

The printer 30 according to the third embodiment of the present invention operates in the same manner as the printer 30 according to the second embodiment (see FIG. 4) except that the command detection section 212 of the interface control section 33 detects a clock rate change command from the host computer 10, that the command detection section 212 notifies the control section 21D of detection of the change command, and that the print data detection section 211 detects the print data contained in the data signal S2 and transmits the detected print data to the print processing execution section 34.

As seen from the description made so far, the data transmission speed can be changed easily according to the printers 30 of the second and third embodiments of the present invention.

4. Fourth Embodiment

Figure 8:
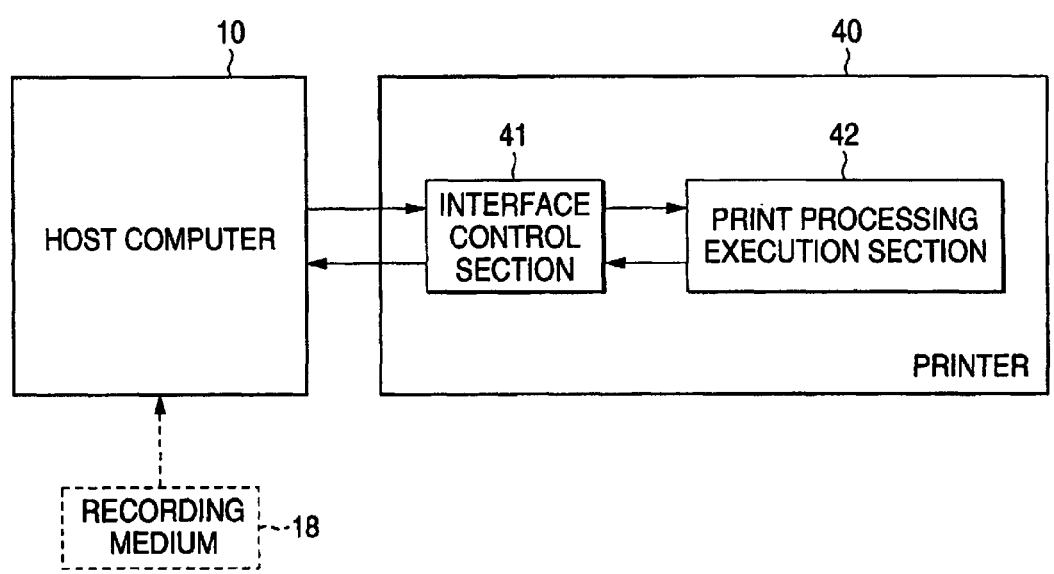
FIG. 8 is a block diagram to show a printer according to a fourth embodiment of the present invention.

Next, a fourth embodiment of the present invention will be discussed with reference to FIGS. 8 and 9. Parts identical with those previously described with reference to the accompanying drawings are denoted by the same reference numerals. As shown in FIG. 8, a printer 40 according to the third embodiment of the present invention is made up of an interface control section 41 connected to a host computer 10 and a print processing execution section 42 connected to the interface control section 41.

Figure 9:
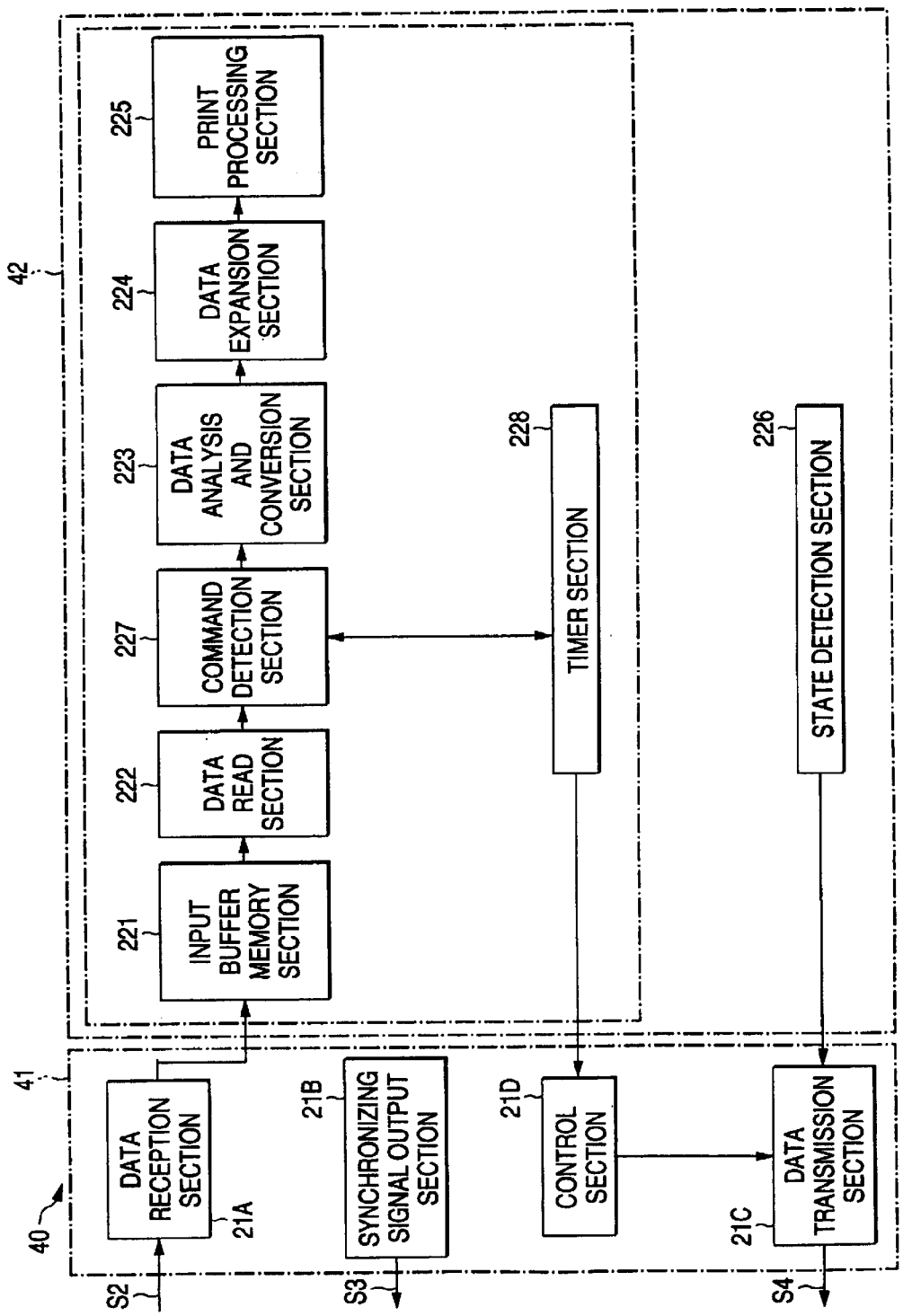
FIG. 9 is a block diagram to show the internal configuration of the printer in FIG. 8.

As shown in FIG. 9, the interface control section 41 comprises a data reception section 21A, a synchronizing signal output section 21B, a data transmission section 21C, and a control section 21D.

The data reception section 21A receives data S2 transmitted from the host computer 10 and outputs the data S2 to the print processing execution section 42. The synchronizing signal output section 21B outputs a synchronizing signal S3 to the host computer 10 and the host computer 10 outputs data to the printer 40 in synchronization with the synchronizing signal S3. The control section 21D detects the expiration of the count value in a timer section 228 of the print processing execution section 42 and upon detection of the expiration, gives a data output command signal to the data transmission section 21C. The data transmission section 21C temporarily stores data transmitted from the printer 40 to the host computer 10, such as a status signal transmitted from a state detection section 226. When receiving the data output command signal from the control section 21D, the data transmission section 21C outputs the data as long as a predetermined length in the stored data to the host computer 10 as a signal S4. That is, it outputs the data as long as the predetermined length in the data stored at a predetermined time interval determined by the count value in the timer section 228 to the host computer 10 as the signal S4.

The print processing execution section 42 has a reception buffer memory section 221, a data read section 222, a command detection section 227, a data analysis and conversion section 223, a data expansion section 224, a print processing section 225, the timer section 228, and the state detection section 226.

The input buffer memory section 221 temporarily stores the data S2 input via the data reception section 21A of the interface control section 41. The data read section 222 reads the data stored in the input buffer memory section 221 in sequence. When the command detection section 227 detects the change command in the data S2, it changes the setup count value in the timer section 228. The data analysis and conversion section 223 analyzes read data and converts the data into a predetermined data format. The data expansion section 224 expands the data provided by the data analysis and conversion section 223 into print image data. The print processing section 225 performs print processing based on the print image data provided by the data expansion section 224.

The timer section 228 has a predetermined count value set and counts in sequence in synchronization with a synchronization signal. The state detection section 226 outputs a status signal indicating the current state of the printer 40, such as printing, print completion, or no paper, in synchronization with the synchronizing signal S3 at a predetermined timing. The status signal output from the state detection section 226 is input to the data transmission section 21C and is temporarily stored therein. In addition to the status signal, for example, a code signal for indicating the model of the printer 40 is stored in the data transmission section 21C. Each of the signals stored in the data transmission section 21C is output from the data transmission section 21C to the host computer 10 as the signal S4 at a predetermined timing.

Next, the operation of the printer 40 will be discussed. First, with the printer 40 and the host computer 10 connected by a printer cable, the synchronizing signal S3 is output from the interface control section 41 of the printer 40 to the host computer 10. As the host computer 10 receives the synchronizing signal S3, it outputs data S2 synchronized with the synchronizing signal S3 from a transmission circuit (not shown) via the printer cable to the printer 40. In the normal state, print data in the data S2 transmitted from the host computer 10 is transmitted via the data reception section 21A to the print processing execution section 42, which then performs print processing for the print data.

On the other hand, when the printer 40 outputs a signal such as the status signal or code signal to the host computer 10 before print processing, during print processing, or upon completion of print processing, the signal is temporarily stored in the data transmission section 21C.

Upon the expiration of the count value in the timer section 228, the control section 21D sends a data output command signal to the data transmission section 21C. When receiving the data output command signal, the data transmission section 21C outputs the part of the temporarily stored data as long as a predetermined length, for example, one byte, to the host computer 10 as signal S4. Whenever the data transmission section 21C receives the data output command signal from the control section 21D, it outputs the signal S4. If no data is stored in the data transmission section 21C at the reception of the data output command signal, the data transmission section 21C does not output the signal S4.

On the other hand, in a system wherein the model of host computer 10 is changed or the host computer 10 is connected to another computer and peripheral machines by a LAN (local area network), when the host computer 10 outputs print data to the printer 40, it needs to change the data transmission speed from the printer 40 because the host computer 10 needs to perform any other processing at the same time. In such a case, the data S2 from the host computer 10 contains a change command for changing the data transmission speed. The change command is input via the data reception section 21A to the print processing execution section 42 and is detected by the command detection section 227 of the print processing execution section 42.

The command detection section 227 changes the count value set in the timer section 228 appropriately based on the change command, thereby changing the output timing of the signal S2 from the data transmission section 21C.

As in the first to third embodiments, the operation of the sections of the printer 40 is controlled by a central processing unit (CPU) for performing required processing in accordance with instructions (a computer program and necessary data) stored in instruction storage means such as a ROM installed in the printer 40.

As indicated by the dashed line in FIG. 8, a program for controlling the printer 40 may be stored on a recording medium 18 and the host computer 10 may read and execute the program stored on the recording medium 18.

5. Fifth Embodiment

Figure 10:
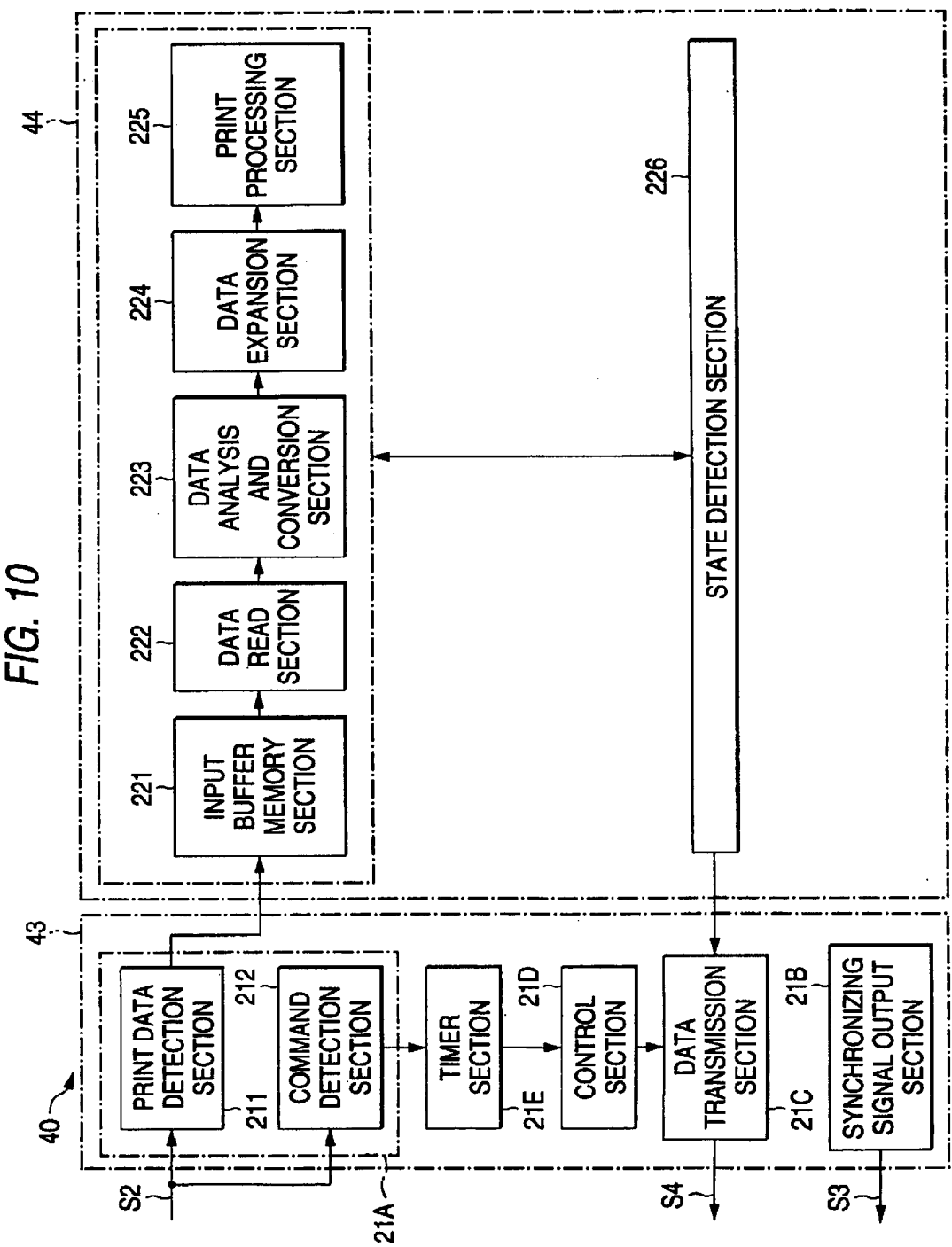
FIG. 10 is a block diagram to show an outline of a printer according to a sixth embodiment of the present invention.

Next, a fifth embodiment of the present invention will be discussed with reference to FIG. 10. Parts identical with those previously described with reference to the accompanying drawings are denoted by the same reference numerals. As shown in FIG. 10, a printer 40 according to the fifth embodiment of the present invention is made up of an interface control section 43 connected to a host computer 10 and a print processing execution section 44 connected to the interface control section 43.

The interface control section 43 comprises a data reception section 21A, a synchronizing signal output section 21B, a data transmission section 21C, a control section 21D, and a timer section 21E. The data reception section 21A is made up of a print data detection section 211 and a command detection section 212.

The print processing execution section 44 has a input buffer memory section 221, a data read section 222, a data analysis and conversion section 223, a data expansion section 224, a print processing section 225, and a state detection section 226.

The print data detection section 211 detects print data in data S2 transmitted from the host computer 10 and transmits the detected print data to the print processing execution section 44. The command detection section 212, which has the same function as the command detection section 223 in FIG. 9, detects a change command in the data S2 and changes the count value set in the timer section 21E in response to the change command. The timer section 21E, which has the same function as the timer section 228 in FIG. 9, has a predetermined count value set and counts in sequence in synchronization with a synchronization signal. The control section 21D detects the expiration of the count value in the timer section 21E and upon detection of the expiration, outputs a data output command signal to the data transmission section 21C.

In the printer 40 according to the fifth embodiment of the present invention, the command detection section 212 of the data reception section 21A detects the change command from the host computer 10. It changes the count value set in the timer section 21E appropriately based on the change command for changing the output timing of the signal S4 from the data transmission section 21C.

As seen from the description made so far, the printers 40 according to the fourth and fifth embodiments can transmit necessary data to the host computer reliably even if the host computer has a low data processing capability.

6. Sixth Embodiment

Next, a sixth embodiment of the present invention will be discussed below with reference to FIGS. 11 to 15.

Figure 11:
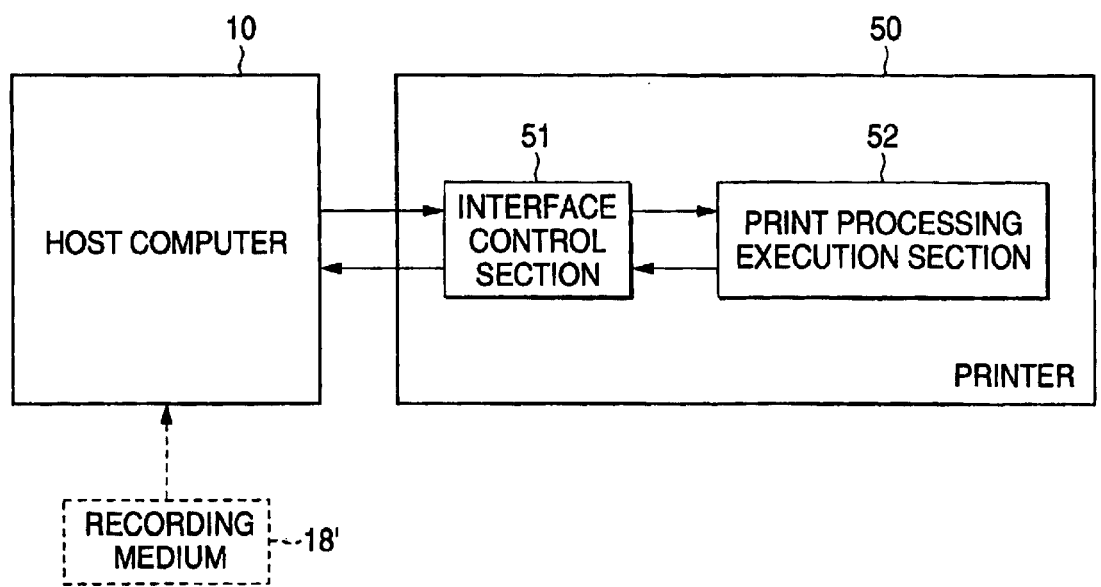
FIG. 11 is a functional block diagram to show the configuration of the main part of the printer in FIG. 10.

FIG. 11 is a block diagram to show an outline of a system using a printer of sixth embodiment of the present invention. Parts identical with those previously described with reference to the accompanying drawings are denoted by the same reference numerals.

FIG. 11 is a block diagram to show an outline of a system using a printer of sixth embodiment of the present invention.

The system is made up of a host 10 such as a computer and a printer 50 connected to the host 10 by a printer cable (not shown), etc. The printer 50 comprises an interface control section (I/F) 51 for transmitting and receiving data to and from the host 10 and a print processing execution section 52.

Figure 12:
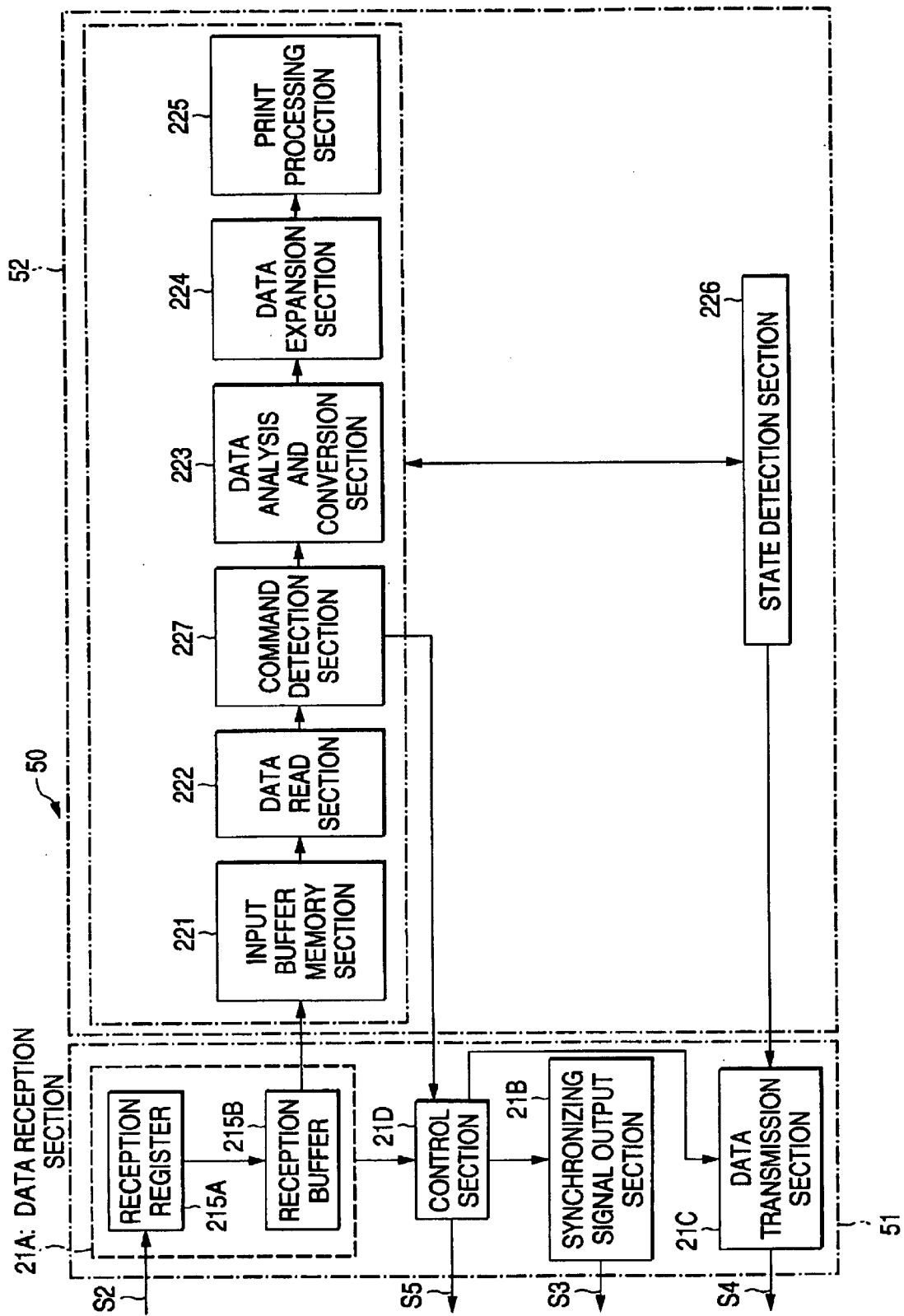
FIG. 12 is a functional block diagram to show an overrun prevention circuit configuration in the interface control section shown in FIG. 11.

The interface control section (I/F) 51 has a data reception section 21A, a synchronizing signal output section 21B, a data transmission section 21C, and a control section 21D as shown in FIG. 12.

The data reception section 21A contains a reception register 215A and a reception buffer 215B. The reception register 215A, which is a shift register consisting of a predetermined number of bits (in the embodiment, 10 bits), is a circuit at the first stage for receiving a data signal S2 as serial data transmitted from the host 10. The reception buffer 215B is a 1-byte buffer placed at the stage following the reception register 215A for latching data received at the reception register 215A. The data received at the data reception section 21A (containing print data, a control command, etc.,) is transferred to the print processing execution section 52. That is, when the transmission data sent one bit at a time from the host 10 is collected as much as the predetermined number of bits (in this case, 10 bits), reception at the reception register 215A is complete and the data is transferred to and latched in the reception buffer 215B, whereby the reception register 215A becomes empty and thus can receive the next shift data. The data transferred to and latched in the reception buffer 215B is DMA-transferred to an input buffer memory section 221 in RAM installed in the print processing execution section 52 described later and is temporarily stored in the input buffer memory section 221. The data is read therefrom as necessary and required print processing is executed.

If another data piece is received at the reception register 215A in a state in which one data piece is not yet read into the input buffer memory section 221 from the reception register 215A, namely, is not DMA-transferred, the control section 21D instructs the synchronizing signal output section 21B to stop outputting a synchronizing signal to the host 10.

The printer of the embodiment is characterized by the fact that the control section 21D has the function; the control section 21D contains a circuit for preventing an overrun error described above by providing the function.

Figure 13:
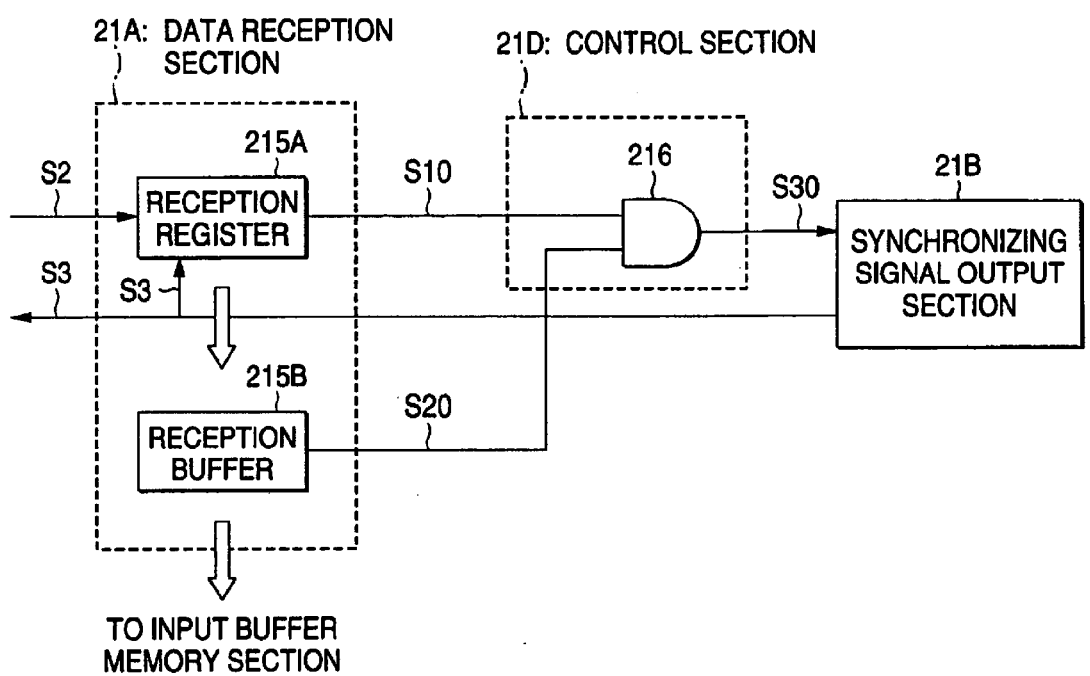
FIG. 13 is a flowchart to show the overrun prevention control operation in the circuit configuration shown in FIG. 12.

Referring to FIG. 13 in addition to FIG. 12, the control section 21D has an AND circuit 216 for outputting a clock stop signal S30 for instructing the synchronizing signal output section (clock generator) 21B to stop outputting a synchronizing signal (clock) S3 if the result of AND logic operation of a signal S10 indicating the reception completion from the reception register 215A and a signal S20 indicating a state in which the reception buffer 215B contains data not yet transferred is true. The control section 21D can also output a control signal S5 consisting of a BUSY signal, a READY signal, or the like to the host 10. The synchronizing signal output section 21B, which is made of a clock generator, outputs a synchronizing signal (clock) S3 to the host 10 and upon reception of an instruction from the control section 21D, stops outputting the clock S3 to the host 10 according to the instruction.

The print processing execution section 52 has the above-described input buffer memory section 221, a data read section 222, a data analysis and conversion section 223, a data expansion section 224, a print processing section 225, a state detection section 226, and a command detection section 227.

The input buffer memory section 221 is formed as a so-called ring buffer and temporarily stores data input through the data reception section 21A in the interface control section 51. That is, the data latched in the reception buffer 215B is DMA-transferred to the input buffer memory section 221 and is read therefrom as necessary for executing required print processing. The counter value set for the DMA transfer described above becomes the size of the ring buffer T5 forming the input buffer memory section 221 (the number of addresses). At the DMA termination time, it becomes necessary to perform processing of returning the pointer to the top of the input buffer memory section 221 and resetting the counter.

The data read section 222 reads the data stored in the input buffer memory section 221 in sequence. The data analysis and conversion section 223 analyzes print data in the read data and converts the print data into a predetermined data format. The data expansion section 224 expands the data provided by the data analysis and conversion section 223 into print image data. The print processing section 225 performs print processing based on the print image data. When the command detection section 227 detects the change command in the data read by the data read section 222, it sends the change command to the control section 21D.

The state detection section 226 outputs a status signal S4 indicating the current state of the printer 50 (printing, print completion, no paper, etc.,) to the data transmission section 21C in the interface control section 51. The data transmission section 21C transmits the status signal S4 to the host 10 in synchronization with the synchronizing signal S3 at a predetermined timing. In addition to the status signal S4, for example, a code signal indicating the model of the printer 50 is transmitted from the printer 50 to the host 10.

The control operation for overrun prevention executed in the interface control section 51 will be discussed with reference to FIG. 13 to FIG. 15.

First, when the host 10 and the printer 50 are powered on with the host 10 and the printer 50 connected by a printer cable, etc., the synchronizing signal output section (clock generator) 21B in the printer 50 outputs a synchronizing signal S3 at a default clock rate to the host 10.

Next, the printer 50 outputs a stop request signal (for example, a BUSY signal) as a control signal S5 from the control section 21D or stop request data (for example, XOFF code) as a status signal S4 from the data transmission section 21C to the host 10 for stopping data transmission from the host 10 to the printer 50.

After completion of necessary initialization processing and warm-up processing, the printer 50 outputs a stop release signal (for example, a READY signal) as a control signal S5 from the control section 21D or stop release data (for example, XON code) as a status signal S4 from the data transmission section 21C to the host 10, which then starts to transmit a data signal S2 as serial data to the printer 50.

Figure 14:
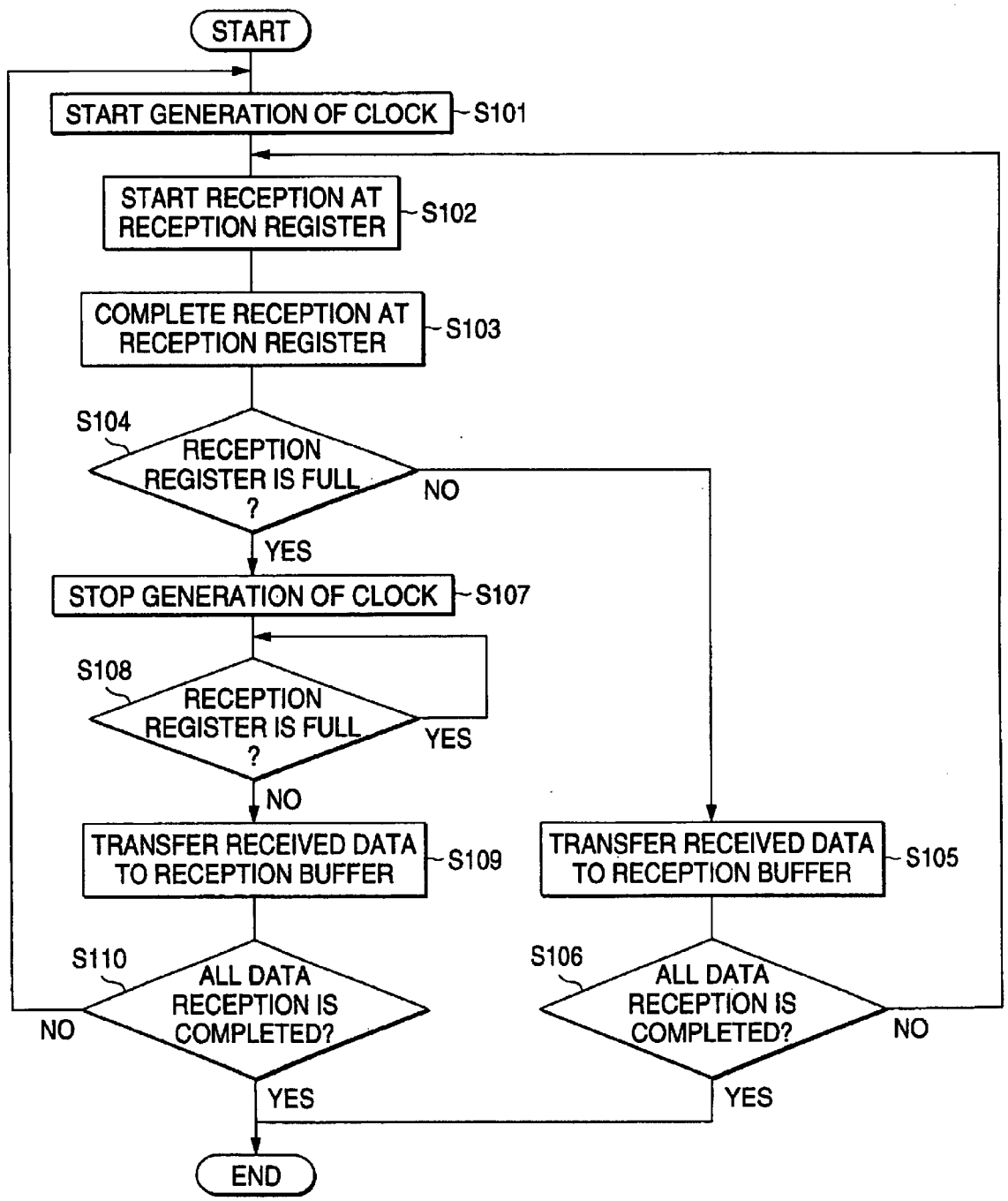
FIG. 14 is a timing chart to show the overrun prevention control operation in the circuit configuration shown in FIG. 12, and FIG. 15(a–d) is a block diagram to show the internal configuration of a printer according to a fifth embodiment of the present invention.

After this, the synchronizing signal S3 is changed from the default clock rate to the rate fitted to performance of the host 10, for example, a clock having a frequency corresponding to the baud rate 1.8 Mbps and generation of the clock at the speed shown in FIG. 15(*d*) is started at step S101 in FIG. 14.

A data signal S2 transmitted from the host 10 to the printer 50 in synchronization with the clock consists of, for example, one start bit, eight data bits (one byte), and one stop bit (10 bits in total). In the data reception section 21A shown in FIG. 12, the start bit is detected on the rising or falling edge of the clock S3 and the eight data bits are also sampled, whereby the 10-bit data is shift-input to the reception register 215A and reception at the reception register 215A is started at step S102.

Subsequently, the stop bit is detected, then 1-byte data is defined, and reception of the 1-byte data, for example, S2*a* shown in FIG. 15(*a*) at the reception register 215A is complete at step S103.

Whether or not the reception buffer 215B is full is judged at step S104. If the reception buffer 215B is not full, the 1-byte data S2*a* is transferred to and latched in the reception buffer 215B at step 105 as shown in FIG. 15(*b*).

The data S2*a* transferred to the reception buffer 215B is DMA-transferred to the input buffer memory section 221 in the RAM installed in the print processing execution section 52 as described above, namely, is read from the reception buffer 215B by a DMA controller, etc., (not shown) and is written into the input buffer memory section 221 in the RAM installed in the print processing execution section 52 via a bus (not shown) for the required print processing described above.

Unless reception of all data is complete at step S106, control returns to S102 and reception at the reception register 215A is started because the reception register 215A becomes empty by executing step S105 and is ready to receive data.

Reception of the 1-byte data at the reception register 215A is complete at step S103 and whether or not the reception buffer 215B is full is judged at step S104. If the reception buffer 215B is full, generation of the clock S3 by the synchronizing signal output section (clock generator) 21B is stopped at step S107.

That is, if the reception register 215A completes reception of 1-byte data S2*e* as shown in FIG. 15(*a*) in a state in which the reception buffer 215B stores data S2*d*, for example, as shown in FIG. 15(*b*), the AND circuit 216 executes AND logic operation of a signal S10 indicating the reception completion from the reception register 215A and a signal S20 indicating the state in which the reception buffer 215B contains data not yet transferred. A clock stop signal S30 for the AND circuit 216 to instruct the synchronizing signal output section (clock generator) 21B to stop the clock goes high as shown in FIG. 15(*c*). As the signal S30 goes high, the synchronizing signal output section (clock generator) 21B stops clock generation as shown in FIG. 15(*d*) at step S107.

Unless the 1-byte data S2*d* in the reception buffer 215B is not DMA-transferred to the input buffer memory section 221, if whether or not the reception buffer 215B is full is judged at step S108, the full state continues. On the other hand, for example, unlike the case shown in FIG. 15, if the reception buffer 215B is not full, the 1-byte data S2*e* is transferred to and latched in the reception buffer 215B at step S109.

Then, control returns to step S101 at which the synchronizing signal output section (clock generator) 21B again starts clock generation and the control operation sequence is repeated until reception completion of all data at step S110. That is, if the reception buffer 215B is not full, the signal S20 indicating a state in which the reception buffer 215B contains data is not output, thus the AND circuit 216 outputs false as the result of AND logic operation of the signals S10 and S20.

Therefore, the clock stop signal S30 for the AND circuit 216 to instruct the clock generator 21B to stop the clock goes low as shown in FIG. 15(*c*), so that the synchronizing signal output section (clock generator) 21B again starts clock generation as shown in FIG. 15(*d*).

To generate the signal S10 indicating reception completion from the reception register 215A, a latch signal that can be transferred may be output, for example, if 10 bits are collected because the reception register 215A is preset to 10 bits. The signal S20 indicating a state in which the reception buffer 215B contains data not yet transferred can be generated by hardware means, for example, for generating a signal set as data is transferred from the reception register 215A to the reception buffer 215B and reset as data is read therefrom.

As described above, in the embodiment, if 2-byte unprocessed data is stored in the printer, namely, 1-byte data is stored in the reception register 215A and 1-byte data is stored in the reception buffer 215B at the same time, as indicated by dotted lines in FIGS. 15(*a*) and 15(*b*) clock generation is stopped.

In the embodiment, the clock may stop instantaneously, but stops only slightly when the input buffer (ring buffer) pointer and counter are reset according to a DMA termination interrupt; the performance of the printer does not much lower from a macroscopic viewpoint.

Therefore, if the CPU or the like in the printer comparatively slow in interrupt processing, a failure is hard to occur in serial data reception. In other words, if the printer is comparatively slow in interrupt processing, it can receive data at a high baud rate from the host.

As many apparently widely different embodiments of the present invention may be made without departing from the spirit and scope thereof, it is to be understood that the present invention is not limited to the specific embodiment thereof except as defined in the appended claims.

For example, in the embodiment, the hardware of the AND circuit 216 is installed in the control section 21D for performing overrun prevention control in the interface control section 51, but software of a program for performing similar control may be installed in place of the hardware. In the embodiment, the synchronizing clock stop circuit for overrun prevention is installed in the control section 21D, in addition, a synchronizing clock stop circuit as software such as a synchronizing clock stop circuit as software for changing the baud rate may be provided in the periphery of or in the synchronizing clock stop circuit as hardware.

In the embodiment, clock generation is stopped when 2-byte unprocessed data is stored in the printer. Specifically, the reception register 215A is formed as a 10-bit shift register and the reception buffer 215B has a 1-byte capacity and if 1-byte data exists each in both the register and the buffer at a time, clock generation is stopped. However, for example, the capacity of the reception buffer 215B may be increased like two bytes or more with the reception register 215A unchanged. That is, the reception buffer 215B may have a capacity of any number of bytes and when the reception buffer 215B becomes full of data, clock generation may be stopped.

Further, as indicated by the dashed line in FIG. 11, a program for controlling the printer 50 may be stored on a recording medium 18 and the host computer 10 may read and execute the program stored on the recording medium 18'.

As seen from the description made so far, according to the present invention, overrun error occurrence can be prevented effectively even if it takes slight time in processing at the DMA transfer termination time from the data reception section to the input buffer memory section.

What is claimed is:

1. A printer for transmitting a synchronizing signal to a host computer, using a sampling signal to detect data including command data and print data, which is transmitted from the host computer in synchronization with the synchronizing signal, generating image data from the detected data, and performing print processing based on the image data,
wherein a frequency of the sampling signal is higher than a frequency of the synchronizing signal.

2. The printer as set forth in claim 1 wherein the synchronizing signal is generated by dividing the sampling signal.

3. A printer comprising:
an interface control section for communicating data between a host computer;
a synchronizing signal output section provided in the interface control section for outputting a synchronizing signal to the host computer; and
a data detection section provided in the interface control section for detecting data including command data and print data, which is transmitted from the host computer to generate image data based on the detected data,
wherein the data is transmitted from the host computer in synchronization with the synchronizing signal, and
wherein the data is detected by using a sampling signal having a frequency higher than a frequency of the synchronizing signal.

4. The printer as set forth in claim 3 wherein the synchronizing signal output section generates the synchronizing signal dividing the sampling signal.

5. A printer comprising:
an interface control section for communicating data with a computer;
a synchronizing signal output section provided in the interface control section for outputting a synchronizing signal to the host computer in order to make the host computer transmit data, which includes command data and print data, to the printer;
a data reception section provided in the interface control section for receiving the data transmitted from the host computer at data transmitting speed based on the synchronizing signal;
a print processing execution section for performing a print processing based on image data generated from the data received in the data reception section;
a command detection section for outputting a detection signal when a change command for changing a clock rate of the synchronizing signal in the command data received at the data reception section is detected; and
a control section provided in the interface control section for outputting a signal instructing the host computer to stop to transmit the data when the detecting signal is received, controlling the synchronizing signal output section so as to change the clock rate of the synchronizing signal as instructed by the change command, and outputting a signal instructing the host computer to restart to transmit the data when the changing of the clock rate is completed.

6. The printer as set forth in claim 5, wherein the command detection section is provided in the print processing execution section.

7. The printer as set forth in claim 5, wherein the command detection section is provided in the print processing execution section.

8. A printer comprising:
an interface control section for communicating data with a host computer;
a synchronizing signal output section provided in the interface control section for outputting a synchronizing signal to the host computer in order to make the host computer transmit data, which includes command data and print data, to the printer;
a data reception section provided in the interface control section for receiving the data transmitted from the host computer at a data transmitting speed;
a print processing execution section for performing a print processing based on image data generated from the data received in the data reception section;
a data transmission section provided in the interface control section for outputting a control signal to the host computer in order to control the host computer;
a command detection section for detecting a change command for changing the data transmitting speed contained in the command data received at the data reception section is detected;
timer section for counting a count value varied in accordance with the data transmitting speed and outputting a count expiration signal when the counting is expired; and
a control section for controlling the data transmission section to transmit data having a predetermined data length into the host computer when the count expiration signal is outputted.

9. A printer comprising:
an interface control section for communicating data with a host computer;
a synchronizing signal output section provided in the interface control section for outputting a synchronizing signal to the host computer in order to make the host computer transmit data, which includes command data and print data, to the printer;

a data reception section provided in the interface control section for receiving the data transmitted from the host computer at data transmitting speed based on the synchronizing signal;

a print processing execution section for performing a print processing based on image data generated from the data received in the data reception section;

an input buffer memory section provided in the print processing execution section for storing the data transferred from the data reception section temporarily, and a control section for controlling the synchronizing signal output section to stop to transmit the synchronizing signal to the host computer if another data piece is received at the data reception section in a state that one data piece is not yet transferred from the data reception section, and instructs the synchronizing signal output section to restart to transmit the synchronizing signal to the host computer when the data reception section becomes ready to receive another data piece.

10. The printer as set forth in claim 9, wherein the data reception section includes a reception register receiving the data from the host computer, and a reception buffer latching the data received by the reception register, and the data is transferred from the reception buffer to the input buffer section.

11. The printer as set forth in claim 10, wherein the control section includes a logic circuit outputting a signal instructing the synchronizing signal output to stop to transmit the synchronizing signal when both of a signal indicating completion of the data reception by the reception register and a signal indicating a state in which the reception buffer contains date not yet transferred from the reception buffer to the input buffer section are input.

12. An interface control method in a printer, comprising the steps of:

outputting a synchronizing signal to a host computer;

receiving data including command data and print data, which is transmitted from the host computer at data transmission speed based on the synchronizing signal;

detecting a change command for changing a clock rate of the synchronizing signal from the command data; and instructing the host computer to stop to transmit data;

changing the clock rate of the synchronizing signal as instructed by the change command; and instructing the host computer to restart to transmit the data when the changing of the clock rate is completed.

13. An interface control method in a printer, comprising the step of:

outputting a synchronizing signal to a host computer;

receiving data including command data and print data, which is transmitted from the host computer at a data transmission speed;

detecting a change command for changing the data transmission speed from the command data;

counting a count value determined by the change command;

detecting an expiration of the counting; and outputting a control data having a predetermined data length to the host computer in accordance with the detection of the count expiration.

14. An interface control method in a printer, comprising the step of:

outputting a synchronizing signal to a host computer;

receiving data including command data and print data, which is transmitted from the host computer at data transmission speed based on the synchronizing signal;

transferring the data to a print processing execution section;

latching the data as much as predetermined amount in the print processing execution section;

stopping the output of the synchronizing signal, if another data piece is received in a state that one data piece is not yet transferred to the print processing execution section; and restarting the output of the synchronizing signal, when the reception of another data piece becomes ready.

15. A recording medium for storing a printer control program read and executed by a host computer, the printer control program for executing the steps of:

outputting a synchronizing signal to a host computer;

receiving data including command data and print data, which is transmitted from the host computer at data transmission speed based on the synchronizing signal;

detecting a change command for changing a clock rate of the synchronizing signal from the command data;

instructing the host computer to stop to transmit the data;

changing the clock rate of the synchronizing signal as instructed by the change command; and instructing the host computer to restart to transmit the data when the changing of the clock rate is completed.

16. A recording medium for storing a printer control program read and executed by a host computer, the printer control program for executing the steps of:

outputting a synchronizing signal to a host computer;

receiving data including command data and print data, which is transmitted from the host computer at a data transmission speed;

detecting a change command for changing the data transmission speed from the command data;

counting a count value determined by the change command; and detecting an expiration of the counting and outputting a control data having a predetermined data length to the host computer in accordance with the detection of the count expiration.

17. A recording medium for storing a printer control program read and executed by a host computer, the printer control program for executing the steps of:

outputting a synchronizing signal to a host computer;

receiving data, including command data and print data, which is transmitted at data transmission speed based on the synchronizing signal;

transferring the data to a print processing execution section;

latching the print data as much as a predetermined amount in the print processing execution section;

stopping the output of the synchronizing signal if another data piece is received in a state that one data piece is not yet transferred to the print processing execution section; and restarting the output of the synchronizing signal, when the reception of another data piece becomes ready.

18. A print system comprising;

a host computer;

a printer connected to the host computer;

synchronizing signal transmission means provided in the printer for transmitting a synchronizing signal at a predetermined clock rate to the host computer;

data transmission means provided in the host computer, for transmitting data to the printer in synchronization with the synchronizing signal at the predetermined clock rate; and means provided in the host computer for instructing the printer to change the synchronizing signal at the predetermined clock rate to a synchronizing signal at a different predetermined clock rate;

means provided in the printer for changing the synchronizing signal at the predetermined clock rate to a synchronizing signal at the different predetermined clock rate specified by the host computer;

stop request means provided in the printer, for requesting the host computer to stop transmitting the data before the clock rate of the synchronizing signal is changed; and stop release means provided in the printer, for releasing the host computer from stopping the data transmission after the clock rate of the synchronizing signal is changed.

19. A date transfer control method for controlling date transfer between a host computer and a printer in a print system comprising the steps of:

transmitting a synchronizing signal at a first clock rate from the printer to the host computer;

starting to transmit a print in synchronization winch the synchronizing signal at the first clock rate from the host computer to the printer;

transmitting a change command for changing the synchronizing signal at the first clock rate to a synchronizing signal at a second clock rate from thee host computer to the printer;

transmitting a stop request signal for requesting the host computer to stop transmitting the print date from the printer to the host computer;

changing the synchronizing signal at the first clock rate into the synchronizing signal at the second clock rate specified in the change command and transmitting the synchronizing signal at the second clock rate by the printer to the host computer; and transmitting a stop release signal for releasing the host computer from stopping the print data transmission from the printer to the host computer.

20. A recording medium for storing a program for controlling data transfer between a host computer and a printer in a print system, the data transfer control program for causing the host computer and the printer to execute the steps of:

transmitting a synchronizing signal at a first clock rate from the printer to the host computer;

starting to transmit a print data in synchronization with the synchronizing signal at the first clock rate from the host computer to the printer;

transmitting a change command for changing the synchronizing signal at the first clock rate to a synchronizing signal at a second clock rate from the host computer to the printer; transmitting a stop request signal for requesting the host computer to a stop transmitting the print data from the printer to the host computer;

changing the synchronizing signal at the first clock rate into the synchronizing signal at the second clock rate specified in the change command and transmitting the synchronizing signal at the second clock rate by the printer to the host computer; and transmitting a stop release signal for releasing the host computer from stopping the print data transmission from the printer to the host computer.

21. The printer as set forth in claim 8, Therein the timer section is provided in the interface control section.

22. The printer as set forth in claim 8, wherein the timer section is provided in the print processing execution section.

23. A print system comprising:

a host computer;

a printer connected to the host computer;

synchronizing signal transmission means, provided in the printer, for transmitting a synchronizing signal at a predetermined clock rate to the host computer;

data transmission means, provided in the host computer, for transmitting data to the printer in synchronization with the synchronizing signal at a data transmission speed;

detection means, provided in the printer, for detecting that the host computer changes the data transmission speed;

count means, provided in the printer, for counting a count value which is determined by the data transmission speed; and data output means, provided in the printer, for outputting a control data to the host computer when the count of the count means is expired.

24. A print system comprising:

a host computer;

a printer connected to the host computer;

synchronizing signal transmission means provided in the printer for transmitting a synchronizing signal at a predetermined clock rate to the host computer;

data transmission means provided in the host computer for transmitting data to the printer in synchronization with the synchronizing signal at the predetermined clock rate and;

data reception means provided in the printer, for receiving the data transmitted from the data transmission means;

print processing execution means provided in the printer, for executing print processing;

transfer means provided in the printer, for transferring the data received in the data reception means;

latching means provided in the printer, for temporarily latching the transferred data in the print processing execution means;

stop request means provided in the printer, for requesting the synchronizing signal transmission means to stop transmitting the synchronizing signal, if the data reception means receives another data piece in a state that one data piece is not yet transferred to the print processing execution section; and stop release means provided in the printer, for releasing the synchronizing signal transmission means from stopping the transmission of the synchronizing signal when the reception of another data piece becomes ready.

25. An interface control method in a printer, comprising steps of:

outputting a synchronizing signal having a first frequency to a host computer; and receiving data including command data and print data, which it transmitted from the host computer in synchronization with the synchronizing signal, by using a sampling signal having a second frequency which is higher than the first frequency.

26. The interface control method as claimed in claim 25, further comprising a step of dividing the sampling signal to generate the synchronizing signal.

27. A recording medium for storing a printer control program which is read and executed by a host computer, the printer control program executing steps of:
- outputting a synchronizing signal having a first frequency to a host computer; and
- receiving data including command data and print data, which is transmitted from the host computer in synchronizing with the synchronizing signal, by using a sampling signal having a second frequency which is higher than the first frequency.

28. The recording medium as claimed in claim 27, wherein the printer control program further executes a step of dividing the sampling signal to generate the synchronizing signal.

29. A print system comprising:
- a host computer;
- a printer, connected to the host computer;
- a synchronizing signal transmitter, provided in the printer, which transmits a synchronizing signal having a first frequency;
- a data transmitter, provided in the host computer, which transmits data including command data and print data to the printer in synchronization with the synchronizing signal; and
- a data detector, provided in the printer, which detects the data transmitted from the host computer by using a sampling signal having a second frequency which is higher than the first frequency.

30. The print systems as claimed in claim 29, further comprising a divider, which divides the sampling signal to generate the synchronizing signal.

* * * * *